(12) United States Patent
Ko et al.

(10) Patent No.: US 8,989,689 B2
(45) Date of Patent: Mar. 24, 2015

(54) APPARATUS AND METHOD FOR PREVENTING OCCURRENCE OF ELECTROMAGNETIC INTERFERENCE IN PORTABLE TERMINAL

(75) Inventors: Han-Ho Ko, Suwon-si (KR); Hyun-Jong Roh, Anyang-si (KR); You-Suk Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 13/176,123

(22) Filed: Jul. 5, 2011

(65) Prior Publication Data

US 2012/0009891 A1  Jan. 12, 2012

(30) Foreign Application Priority Data

Jul. 12, 2010  (KR) ..................... 10-2010-0066883

(51) Int. Cl.
*H04B 1/10* (2006.01)
*H04B 15/06* (2006.01)

(52) U.S. Cl.
CPC ..................... *H04B 15/06* (2013.01)
USPC ........... 455/296; 455/63.1; 375/130; 375/285

(58) Field of Classification Search
CPC ................................ H04B 2215/065
USPC .................................. 455/269, 296
See application file for complete search history.

(56) References Cited

U.S. PATENT DOCUMENTS

| | | | | |
|---|---|---|---|---|
| 4,699,466 A * | 10/1987 | Brandstetter et al. | ......... | 359/308 |
| 4,957,337 A * | 9/1990 | Ogawa et al. | ..................... | 385/1 |
| 5,216,713 A * | 6/1993 | Lindholm | ..................... | 380/207 |
| 5,263,055 A * | 11/1993 | Cahill | ......................... | 375/346 |
| 5,488,627 A * | 1/1996 | Hardin et al. | ................. | 375/139 |
| 5,706,256 A * | 1/1998 | Hood et al. | ..................... | 368/10 |
| 6,031,299 A * | 2/2000 | Stumfall et al. | ............. | 307/106 |
| 6,341,076 B1 * | 1/2002 | Kadatskyy et al. | ........ | 363/56.12 |
| 6,784,625 B1 * | 8/2004 | Andrews | ...................... | 315/276 |
| 6,833,693 B2 * | 12/2004 | Andrews | ...................... | 323/288 |
| 6,847,257 B2 | 1/2005 | Edwards et al. | | |
| 6,879,300 B2 * | 4/2005 | Rochelle et al. | ............. | 343/867 |
| 6,891,623 B1 * | 5/2005 | Baudon et al. | ................ | 356/491 |
| 6,960,961 B2 * | 11/2005 | Andrews | ......................... | 331/18 |
| 7,129,869 B2 * | 10/2006 | Furuta et al. | ................... | 341/133 |
| 7,342,528 B2 * | 3/2008 | Ng et al. | ........................ | 341/153 |
| 7,522,928 B2 * | 4/2009 | O'Mahony | ................... | 455/501 |
| 7,804,920 B2 * | 9/2010 | Deisher et al. | ............... | 375/346 |
| 7,894,838 B2 * | 2/2011 | O'Mahony | ..................... | 455/501 |
| 8,259,753 B2 * | 9/2012 | Ross et al. | ..................... | 370/473 |
| 8,324,823 B2 * | 12/2012 | Choi et al. | ..................... | 315/244 |
| 8,583,210 B2 * | 11/2013 | Doerr et al. | ..................... | 600/411 |
| 8,855,554 B2 * | 10/2014 | Cook et al. | ..................... | 455/41.1 |
| 2004/0213324 A1 * | 10/2004 | Hall et al. | ..................... | 375/130 |
| 2004/0217748 A1 * | 11/2004 | Andrews | ....................... | 323/288 |
| 2004/0217822 A1 * | 11/2004 | Andrews | ......................... | 331/78 |

(Continued)

*Primary Examiner* — Hai V Nguyen

(74) *Attorney, Agent, or Firm* — Jefferson IP Law, LLP

(57) ABSTRACT

An apparatus and method for setting a modulation frequency within a non-use frequency range so as to reduce ElectroMagnetic Interference (EMI) occurring during frequency modulation in a portable terminal are provided. The apparatus includes a controller and a frequency set unit. At frequency modulation, the controller determines whether a modulation frequency corresponds to a frequency inducing EMI. In a case where it is determined that the modulation frequency corresponds to the frequency inducing EMI, the frequency set unit resets the modulation frequency.

17 Claims, 3 Drawing Sheets

(56) References Cited

U.S. PATENT DOCUMENTS

| | | | |
|---|---|---|---|
| 2006/0063495 A1* | 3/2006 | Hamilton | 455/90.3 |
| 2007/0290894 A1* | 12/2007 | Ng et al. | 341/50 |
| 2008/0240313 A1* | 10/2008 | Deisher et al. | 375/346 |
| 2009/0327783 A1* | 12/2009 | Doss | 713/340 |
| 2010/0166039 A1* | 7/2010 | Jeon et al. | 375/130 |
| 2010/0296671 A1* | 11/2010 | Khoury et al. | 381/111 |
| 2011/0160806 A1* | 6/2011 | Lyden et al. | 607/63 |
| 2013/0073312 A1* | 3/2013 | Thompson et al. | 705/2 |
| 2013/0093341 A1* | 4/2013 | Choi et al. | 315/200 R |
| 2013/0342025 A1* | 12/2013 | Cook et al. | 307/104 |

\* cited by examiner

APPARATUS AND METHOD FOR PREVENTING OCCURRENCE OF ELECTROMAGNETIC INTERFERENCE IN PORTABLE TERMINAL

PRIORITY

This application claims the benefit under 35 U.S.C. §119(a) of a Korean patent application filed in the Korean Intellectual Property Office on Jul. 12, 2010 and assigned Serial No. 10-2010-0066883, the entire disclosure of which is hereby incorporated by reference.

BACKGROUND OF THE INVENTION

1. Field of the Invention

The present invention relates to an audio amplifier of a portable terminal. More particularly, the present invention relates to an apparatus and method for setting a modulation frequency within a non-used frequency range in order to reduce ElectroMagnetic Interference (EMI) occurring at frequency modulation in a portable terminal.

2. Description of the Related Art

Portable devices are commonly called portable terminals. In recent years, the portable terminal may provide a voice and video call.

In a case of transmitting a voice signal using the portable terminal, the portable terminal amplifies, by a constant gain, a voice signal input through a microphone. After that, the portable terminal converts the amplified voice signal into a high frequency signal and transmits the high frequency signal to the external. In the related art, the gain for amplifying the voice signal in the portable terminal is fixed.

In a case of amplifying a voice signal as above, ElectroMagnetic Interference (EMI) can occur; however, the occurrence of EMI can be reduced by way of a spread spectrum modulation technology. However, the spread spectrum modulation technology is to reduce a radiated peak of EMI as above, so EMI still occurs in all frequency bands.

Because the occurrence of EMI as described above is a cause of inducing an erroneous operation of the portable terminal, manufacturers are exploring methods for reducing the occurrence of EMI. But, the known solutions to address the problem of EMI are imperfect.

Accordingly, to address the above problem, there is a need for an apparatus and method for preventing EMI in a portable terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for reducing an occurrence of ElectroMagnetic Interference (EMI) in a portable terminal.

Another aspect of the present invention is to provide an apparatus and method for adjusting a harmonic frequency range of an audio amplifier in a portable terminal.

A further aspect of the present invention is to provide an apparatus and method for setting a modulation frequency corresponding to an unused frequency in a portable terminal.

The above aspects are addressed by providing an apparatus and method for preventing the occurrence of EMI in a portable terminal.

In accordance with an aspect of the present invention, an apparatus for preventing the occurrence of ElectroMagnetic Interference (EMI) in a portable terminal is provided. The apparatus includes a controller and a frequency set unit. At frequency modulation, the controller determines whether a modulation frequency corresponds to a frequency that induces EMI. In a case where it is determined that the modulation frequency corresponds to the frequency inducing EMI, the frequency set unit resets the modulation frequency.

In accordance with another aspect of the present invention, a method for preventing the occurrence of EMI in a portable terminal is provided. The method includes, at frequency modulation, determining whether a modulation frequency corresponds to a frequency that induces EMI and, in a case where the modulation frequency corresponds to the frequency inducing EMI, resetting the modulation frequency.

In accordance with another aspect of the present invention, an apparatus for eliminating EMI in a portable terminal is provided. The apparatus includes a storage unit, a controller, and a frequency set unit. The storage unit stores frequency information that is information on a frequency used in the portable terminal. The controller determines a modulation frequency of data to be transmitted, and determines whether the frequency corresponds to a frequency that induces EMI. The frequency set unit resets a modulation frequency within a range not inducing EMI. The controller compares the frequency information with the modulation frequency and, at frequency modulation, determines whether the modulation frequency corresponds to a frequency that induces EMI.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for altering a modulation frequency of an audio amplifier to reduce the occurrence of ElectroMagnetic Interference (EMI) in a portable terminal.

Figure 1:
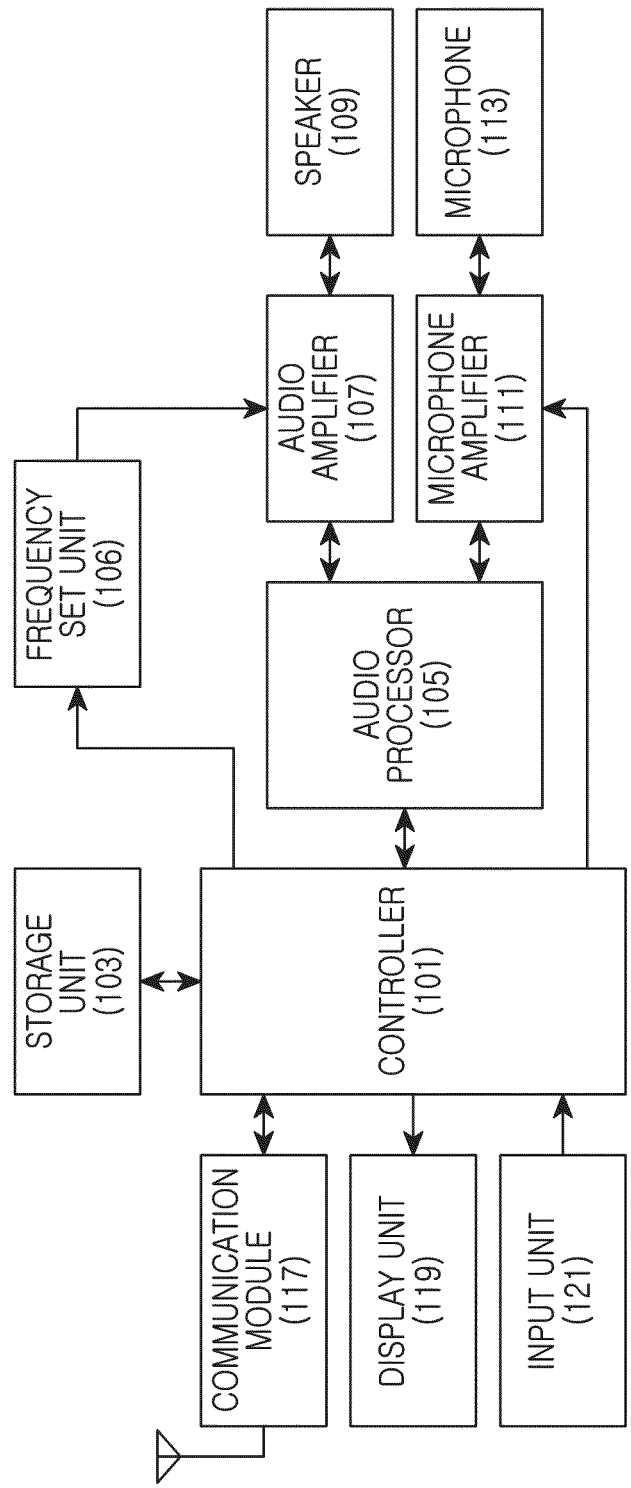
FIG. 1 is a block diagram illustrating a construction of a portable terminal for reducing an occurrence of ElectroMagnetic Interference (EMI) according to an exemplary embodiment of the present invention.
Figure 2:
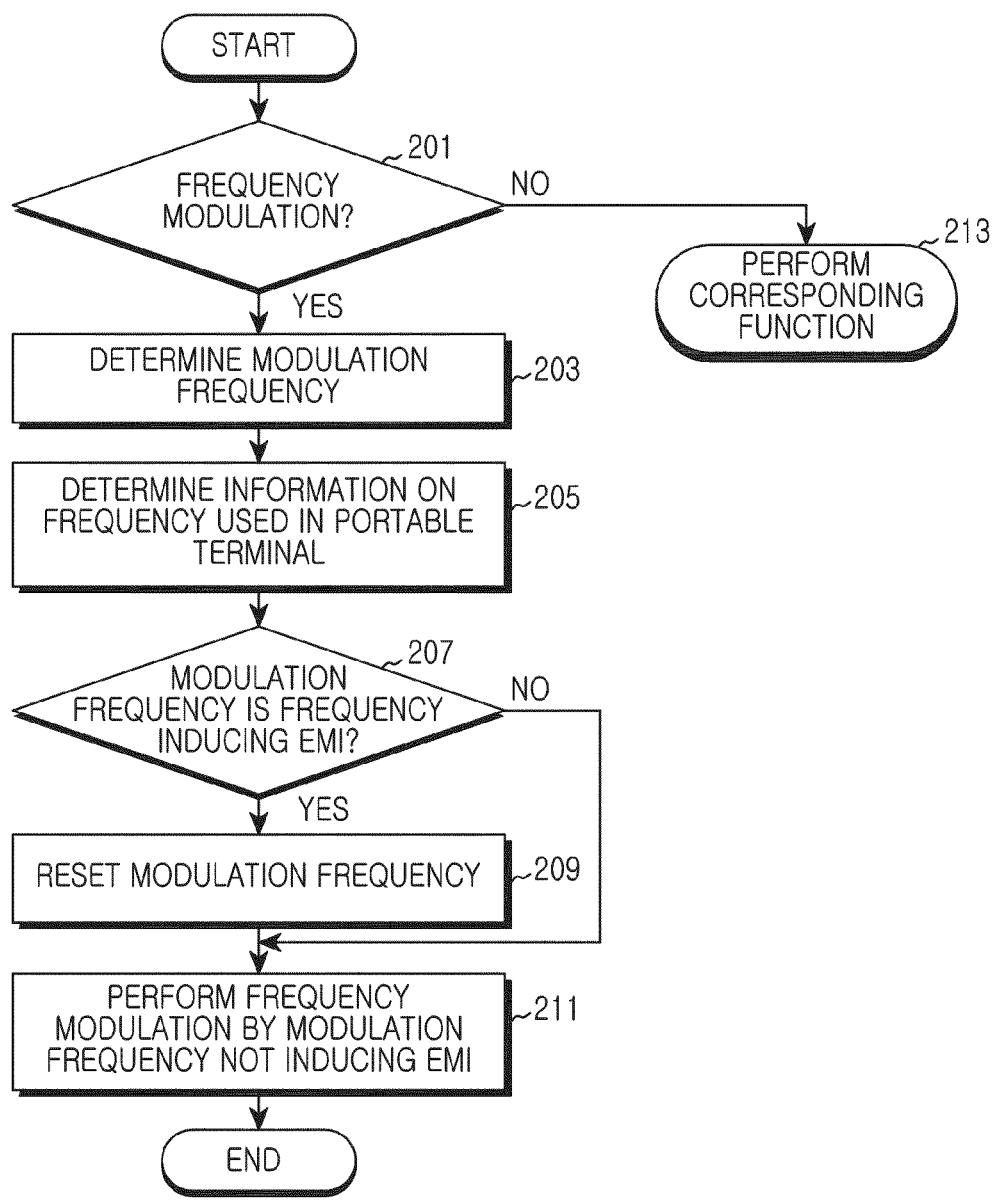
FIG. 2 is a flowchart illustrating a process of preventing the occurrence of EMI in a portable terminal according to an exemplary embodiment of the present invention.
Figure 3:
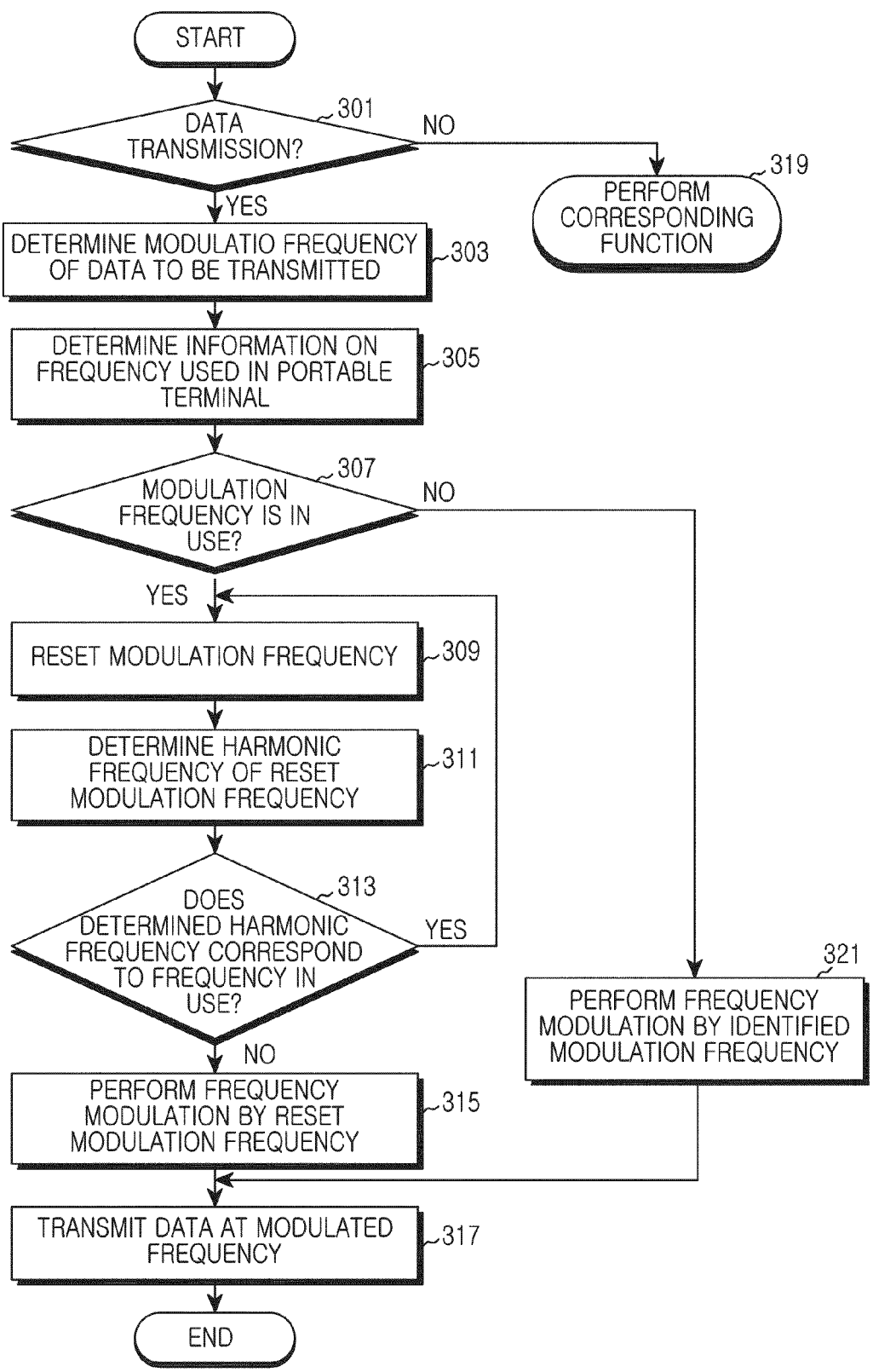
FIG. 3 is a flowchart illustrating a process of preventing the occurrence of EMI in a portable terminal according to an exemplary embodiment of the present invention.

FIGS. 1 through 3, described below, and the various exemplary embodiments of the present invention provided are by way of illustration only and should not be construed in any way that would limit the scope of the present invention. Those skilled in the art will understand that the principles of the present disclosure may be implemented in any suitably arranged communications system. The terms used to describe various exemplary embodiments of the present invention provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a construction of a portable terminal for reducing the occurrence of EMI according to an exemplary embodiment of the present invention.

Referring to FIG. 1, the portable terminal includes a controller 101, a storage unit 103, an audio processor 105, a frequency set unit 106, an audio amplifier 107, a speaker 109, a microphone amplifier 111, a microphone 113, a communication module 117, a display unit 119, and an input unit 121. The portable terminal may include additional units that are not illustrated here merely for sake of clarity. Similarly, the functionality of two or more of the above units may be integrated into a single component.

The controller 101 controls a general operation for the portable terminal. For instance, the controller 101 performs a process and control for voice call and data communication. In addition to a general function, when performing a frequency modulation process, the controller 101 processes to reset a modulation frequency to a frequency not currently used in the portable terminal according to an exemplary embodiment of the present invention. This is for addressing a problem in that EMI can occur when the modulation frequency is included in a frequency band used in the portable terminal.

That is, because the controller 101 is aware of information regarding a frequency being used in the portable terminal, the controller 101 determines a modulation frequency for a frequency modulation process and determines whether the modulation frequency is a frequency that induces EMI.

If it is determined that the modulation frequency is the frequency inducing EMI, the controller 101 processes to reset the modulation frequency to prevent the occurrence of EMI. At this time, the controller 101 processes to control the frequency set unit 106 to reset the modulation frequency.

The storage unit 103 stores a program for controlling a general operation of the portable terminal, temporary data generated during terminal operation, system parameters, and other storage data.

The audio processor 105 controls the input/output of voice for voice call using the speaker 109 and the microphone 113. For instance, the audio processor 105 converts a digital signal provided from the controller 101 into an analog signal for output through the speaker 109. For another instance, the audio processor 105 converts an analog signal, provided from the microphone amplifier 111, into a digital signal.

At the time of performing a frequency modulation process, the frequency set unit 106 sets a modulation frequency, and determines whether the set modulation frequency induces EMI.

If it is determined that the set modulation frequency induces EMI, the frequency set unit 106 processes to reset the set modulation frequency to a modulation frequency not inducing EMI, under the control of the controller 101.

The modulation frequency inducing EMI includes a modulation frequency equal to a frequency already being used in the portable terminal. The frequency set unit 106 can determine whether a harmonic frequency of a reset modulation frequency is included in a frequency band used in the portable terminal. If it is determined that the harmonic frequency is included, the frequency set unit 106 resets the reset modulation frequency to a frequency not inducing EMI.

After resetting a modulation frequency of a band not being used in the portable terminal as above, the frequency set unit 106 provides the reset modulation frequency to the audio amplifier 107.

The audio amplifier 107 amplifies an analog signal provided from the audio processor 105 according to an audio amplification factor, and outputs the amplified analog signal through the speaker 109.

The microphone amplifier 111 amplifies a voice signal provided through the microphone 113 according to a gain determined under the control of the controller 101.

The communication module 117 processes a Radio Frequency (RF) signal transmitted/received through an antenna.

The display unit 119 displays state information of the portable terminal, a character input by a user, a moving picture, a still picture, and the like, according to the control of the controller 101.

The input unit 121 provides data corresponding to user's key input, to the controller 101.

A function of the frequency set unit 106 can be implemented by the controller 101 of the portable terminal. However, these are separately constructed and shown as an exemplary construction for description convenience, and should not limit the scope of the present invention. It should be understood by those skilled in the art that various modifications of construction can be made within the scope of the present invention. For example, construction may be such that all of these functions can be processed in the controller 101.

FIG. 2 is a flowchart illustrating a process of preventing the occurrence of EMI in a portable terminal according to an exemplary embodiment of the present invention.

Referring to FIG. 2, in step 201, the portable terminal determines whether it performs a frequency modulation process.

If it is determined in step 201 that the portable terminal does not perform the frequency modulation process, the portable terminal proceeds to step 213 and performs a corresponding function (e.g., an idle mode).

On the other hand, if it is determined in step 201 that the portable terminal performs the frequency modulation process, the portable terminal proceeds to step 203 and determines a modulation frequency, and then proceeds to step 205 and determines information of a frequency being used in the portable terminal.

After that, the portable terminal proceeds to step 207 and determines whether the modulation frequency determined in step 203 is a frequency that induces EMI.

Here, the frequency inducing EMI refers to a frequency equal to a frequency already used in the portable terminal. This definition is given because EMI occurs when the portable terminal uses the same frequency for different functions. As one example, in a case where the portable terminal performs a frequency modulation process while tuning in for Frequency Modulation (FM) radio, a frequency inducing EMI is a modulation frequency equal to an FM radio frequency (e.g., 88.1 MHz).

If it is determined in step 207 that the modulation frequency is the frequency inducing EMI, the portable terminal proceeds to step 209 and resets the modulation frequency. At this time, the portable terminal resets the modulation frequency to a frequency corresponding to a frequency band not being used in the portable terminal, thus preventing the occurrence of EMI.

Next, the portable terminal proceeds to step 211 and performs a frequency modulation process by the modulation frequency reset in step 209, i.e., by a frequency not inducing EMI.

On the other hand, if it is determined in step 207 that the modulation frequency is a frequency not inducing EMI, the portable terminal jumps to step 211 and performs the frequency modulation process without resetting the modulation frequency.

After performing the frequency modulation process using the modulation frequency not inducing EMI as above, the portable terminal terminates the algorithm according to an exemplary embodiment of the present invention.

FIG. 3 is a flowchart illustrating a process of preventing the occurrence of EMI in a portable terminal according to an exemplary embodiment of the present invention.

Referring to FIG. 3, in step 301, the portable terminal determines whether it performs data transmission.

If it is determined in step 301 that the portable terminal does not perform the data transmission, the portable terminal proceeds to step 319 and performs a corresponding function (e.g., an idle mode).

On the other hand, if it is determined in step 301 that the portable terminal performs the data transmission, the portable terminal proceeds to step 303 and determines a modulation frequency of data to be transmitted.

After that, the portable terminal proceeds to step 305 and determines information of a frequency being used in the portable terminal.

Here, the frequency being used in the portable terminal includes a frequency used for performing a function supported by the portable terminal. The portable terminal can store frequency information defined as in Table 1 below. This table lists certain standardized frequencies for exemplary purposes only, and other frequencies can, of course, be used.

TABLE 1

| Function | Frequency used |
|---|---|
| GSM | 850 to 900 MHz |
| | 1800 to 1900 MHz |
| WCDMA | 2.1 GHz |
| Bluetooth/Wi-Fi | 2.4 GHz |
| FM radio | 88 to 108 MHz |

Next, the portable terminal proceeds to step 307 and determines whether the modulation frequency determined in step 303 is a frequency used in the portable terminal, using the frequency information determined in step 305.

If it is determined in step 307 that the modulation frequency is the frequency being used in the portable terminal, the portable terminal determines that EMI will occur due to the modulation frequency corresponding to an already used frequency band, and the portable terminal proceeds to step 309 and processes to reset the modulation frequency.

At this time, the portable terminal resets the modulation frequency to a frequency not being used in the portable terminal.

The portable terminal resets a modulation frequency to prevent EMI from occurring because the modulation frequency overlaps with the frequency being used in the portable terminal. The portable terminal resets the modulation frequency in the following manner.

After resetting the modulation frequency, the portable terminal proceeds to step 311 and determines a harmonic frequency of the reset modulation frequency. Next, the portable terminal proceeds to step 313 and determines whether the determined harmonic frequency corresponds to a frequency previously in use.

If it is determined in step 313 that the harmonic frequency corresponds to the frequency previously in use, the portable terminal determines that the reset modulation frequency can induce EMI, so the portable terminal returns to step 309 and resets the reset modulation frequency to a modulation frequency not inducing EMI.

On the other hand, if it is determined in step 313 that the harmonic frequency does not correspond to the frequency previously in use, the portable terminal determines that the reset modulation frequency would not induce EMI, so the portable terminal proceeds to step 315 and performs a frequency modulation process by the reset modulation frequency not inducing EMI.

Further, if it is determined in step 307 that the modulation frequency is the frequency not being used in the portable terminal, the portable terminal proceeds to step 321 and performs a frequency modulation process by the modulation frequency determined in step 303.

After performing the frequency modulation process as described above, the portable terminal proceeds to step 317 and transmits data at a modulated frequency.

That is, the portable terminal resets a modulation frequency to be different from a frequency being used in the portable terminal. For instance, when tuning FM radio reception to 88.1 MHz, the portable terminal adjusts a modulation frequency to 3 MHz, so that harmonic frequencies, such as 87 MHz or 90 MHz, of the modulation frequency will be prevented from overlapping with the FM radio frequency of 88.1 MHz.

After that, the portable terminal terminates the algorithm according to an exemplary embodiment of the present invention.

As described above, exemplary embodiments of the present invention have an effect of being able to prevent the occurrence of EMI by, in a case where it is determined that a modulation frequency is a frequency of a band previously in use, resetting the modulation frequency to a frequency of a band not being used in a portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for avoiding generation of ElectroMagnetic Interference (EMI) in a portable terminal, the apparatus comprising:
   a storage unit configured to store frequency information comprising information of a frequency currently being used in the portable terminal; and
   a controller configured to determine whether the portable terminal is to perform a frequency modulation process and, when the frequency modulation process is to be performed, to determine a modulation frequency and the frequency currently being used, to determine whether generating the determined modulation frequency would induce the EMI in the portable terminal according to the frequency currently being used, and, in a case where it is determined that generating the determined modulation frequency would induce the EMI according to the frequency currently being used, to reset the modulation frequency to a frequency that would not induce the EMI according to the frequency currently being used,
   wherein, after resetting the modulation frequency, the controller controls to generate the reset modulation frequency and perform the frequency modulation process using the reset modulation frequency not inducing the EMI.

2. The apparatus of claim 1, wherein the controller determines whether the modulation frequency corresponds to the frequency that would induce the EMI by determining the frequency currently being used in the portable terminal and determining whether the modulation frequency corresponds to the frequency currently being used in the portable terminal.

3. The apparatus of claim 2, wherein, in a case where it is determined that the modulation frequency corresponds to the frequency currently being used in the portable terminal, the controller determines the modulation frequency as the frequency that would induce the EMI.

4. The apparatus of claim 2, wherein the modulation frequency is determined to correspond to the frequency currently being used if the modulation frequency or a harmonic thereof matches the frequency being used.

5. The apparatus of claim 1, wherein, after resetting the modulation frequency one or more times, the controller resets the reset modulation frequency by determining a harmonic frequency of the reset modulation frequency and then determining if the determined harmonic frequency comprises a frequency in a frequency band currently being used in the portable terminal.

6. The apparatus of claim 5, wherein, in a case where it is determined that the determined harmonic frequency comprises the frequency in the frequency band currently being used in the portable terminal, the controller resets the reset modulation frequency.

7. A method for avoiding generation of ElectroMagnetic Interference (EMI) in a portable terminal, the method comprising:
   determining whether the portable terminal is to perform a frequency modulation process;
   when it is determined that frequency modulation process is to be performed by the portable terminal, determining a modulation frequency and determining whether generating the determined modulation frequency would induce the EMI in the portable terminal;
   in a case where it is determined that generating the determined modulation frequency would induce the EMI, determining a modulation frequency that would not induce the EMI and resetting the modulation frequency to the modulation frequency that would not induce the EMI; and
   after resetting the modulation frequency, generating the reset modulation frequency and performing the frequency modulation process using the reset modulation frequency not inducing the EMI.

8. The method of claim 7, wherein the determining of whether the modulation frequency corresponds to the frequency that would induce the EMI comprises:
   determining information of a frequency currently being used in the portable terminal; and
   determining whether the modulation frequency corresponds to the frequency currently being used in the portable terminal.

9. The method of claim 8, further comprising, in a case where it is determined that the modulation frequency corresponds to the frequency currently being used in the portable terminal, determining the modulation frequency as the frequency that would induce the EMI.

10. The method of claim 8, wherein the modulation frequency is determined to correspond to the frequency currently being used if the modulation frequency or a harmonic thereof matches the frequency currently being used.

11. The method of claim 7, wherein the resetting of the modulation frequency comprises:
    after resetting the modulation frequency one or more times, determining a harmonic frequency of the reset modulation frequency; and
    determining whether the determined harmonic frequency comprises a frequency in a frequency band currently being used in the portable terminal.

12. The method of claim 11, further comprising, in a case where the determined harmonic frequency comprises the frequency in the frequency band currently being used in the portable terminal, resetting the reset modulation frequency.

13. An apparatus for avoiding generation of ElectroMagnetic Interference (EMI) in a portable terminal, the apparatus comprising:
    a storage unit configured to store frequency information comprising information of a frequency currently being used in the portable terminal; and
    a controller configured to determine whether the portable terminal is to perform a frequency modulation process, to determine a modulation frequency of data to be transmitted, to, when the frequency modulation process is to be performed, determine whether the determined modulation frequency of the data to be transmitted would correspond to a frequency currently being used in the portable terminal, and to reset the modulation frequency of the data to be transmitted to be within a range that would not induce the EMI according to the frequency currently being used,
    wherein the controller compares frequency information of the frequency currently being used with the modulation frequency of the data to be transmitted and, when the frequency modulation process is to be performed, determines whether the modulation frequency of the data to be transmitted would correspond to the frequency that would induce the EMI according to the frequency currently being used.

14. The apparatus of claim 13, wherein, in a case where it is determined that the modulation frequency corresponds to the frequency currently being used in the portable terminal, the controller determines the modulation frequency as the frequency that would induce the EMI.

15. The apparatus of claim 13, wherein the modulation frequency is determined to correspond to the frequency that would induce the EMI if the modulation frequency or a harmonic thereof matches the frequency currently being used in the portable terminal.

16. The apparatus of claim 13, wherein, after the resetting of the modulation frequency one or more times, the controller determines a harmonic frequency of the reset modulation frequency and then resets the modulation frequency according to the determined harmonic frequency.

17. The apparatus of claim 16, wherein, in a case where it is determined that the determined harmonic frequency comprises a frequency in a frequency band currently being used in the portable terminal, the controller resets the reset modulation frequency.

* * * * *